(12) United States Patent
Chen et al.

(10) Patent No.: US 12,477,096 B2
(45) Date of Patent: Nov. 18, 2025

(54) CALIBRATION METHOD, ELECTRONIC DEVICE, AND NON-TRANSITORY COMPUTER READABLE STORAGE MEDIUM

(71) Applicant: HTC Corporation, Taoyuan (TW)

(72) Inventors: Yan-Min Chen, Taoyuan (TW); Yan-Min Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 35 days.

(21) Appl. No.: 18/365,226

(22) Filed: Aug. 4, 2023

(65) Prior Publication Data

US 2025/0047828 A1    Feb. 6, 2025

(51) Int. Cl.
*H04N 13/327* (2018.01)
*H04N 13/383* (2018.01)

(52) U.S. Cl.
CPC ......... *H04N 13/327* (2018.05); *H04N 13/383* (2018.05)

(58) Field of Classification Search
CPC ............................ H04N 13/327; H04N 13/383
USPC ............................................................. 348/51
See application file for complete search history.

(56) References Cited

U.S. PATENT DOCUMENTS

| | | | | |
|---|---|---|---|---|
| 9,405,125 B2* | 8/2016 | Hayashi | ............... | H04N 13/312 |
| 10,452,137 B2 | 10/2019 | Noda et al. | | |
| 11,874,488 B1* | 1/2024 | Fan | ...................... | G02B 5/1819 |
| 2006/0061858 A1* | 3/2006 | Long | ..................... | G02B 17/026 |
| | | | | 359/422 |
| 2015/0339512 A1 | 11/2015 | Son et al. | | |
| 2015/0346494 A1* | 12/2015 | Tanaka | ................. | G02B 27/017 |
| | | | | 345/647 |
| 2016/0147069 A1* | 5/2016 | Tanaka | ............... | G02B 27/0176 |
| | | | | 359/632 |
| 2021/0048686 A1* | 2/2021 | Muschielok | ........... | G02C 7/027 |
| 2023/0393655 A1* | 12/2023 | Mizuo | ................ | G02B 27/0093 |
| 2024/0004143 A1* | 1/2024 | Zhao | .................. | G02B 27/0172 |

FOREIGN PATENT DOCUMENTS

| | | |
|---|---|---|
| CN | 103310186 A | 9/2013 |
| CN | 108780223 A | 11/2018 |
| CN | 114546112 A | 5/2022 |

OTHER PUBLICATIONS

The office action of the corresponding Taiwanese application No. TW112140761 issued on Aug. 27, 2024.

* cited by examiner

*Primary Examiner* — Gims S Philippe
(74) *Attorney, Agent, or Firm* — CKC & Partners Co., LLC

(57) ABSTRACT

A calibration method is disclosed. The calibration method is suitable for an electronic device comprising an HMD device (head-mounted device). The calibration method includes the following operations: obtaining a first eye information of a first eye of a user when the user is gazing at a first calibration gazing point; and calculating at least one of a second eye information of the first eye of the user and a third eye information of a second eye of the user by mirror symmetrizing the first eye information.

17 Claims, 6 Drawing Sheets

CALIBRATION METHOD, ELECTRONIC DEVICE, AND NON-TRANSITORY COMPUTER READABLE STORAGE MEDIUM

FIELD OF INVENTION

The present application relates to a calibration method, an electronic device, and a non-transitory computer readable storage medium. More particularly, the present application relates to a calibration method, an electronic device, and a non-transitory computer readable storage medium with eye tracking function.

BACKGROUND

In VR and AR application scenarios, by tracking the user's eye movements through sensing devices or camera circuits, the user's eye sight and eye appearance and other related information are reflected in the virtual world, so that the user can interact with others in the virtual world of the virtual reality (VR) or augmented reality (AR) environment.

In order to realize the above-mentioned reflection of the user's eye movement information into the virtual world of the VR/AR environment, a calibration process will be carried out, so that the user's eye movement information can be more accurately mapped in the virtual world. However, the calibration process may be time consuming, and the user's eye may be discomfort after watching the VR content for a long time, which reduces the accuracy of the collection and accumulation conditions and affects the overall calibration accuracy.

SUMMARY

The disclosure provides a calibration method. The calibration method is suitable for an electronic device comprising an HMD device (head-mounted device). The calibration method includes the following operations: obtaining a first eye information of a first eye of a user when the user is gazing at a first calibration gazing point; and calculating at least one of a second eye information of the first eye of the user and a third eye information of a second eye of the user by mirror symmetrizing the first eye information.

The disclosure provides an electronic device. The electronic device includes a camera circuit and a processing circuit. The camera circuit is configured to capture a first eye information of a first eye of a user when the user is gazing at a first calibration gazing point. The processing circuit is coupled to the camera circuit, in which the processing circuit is configured to calculate at least one of a second eye information of the first eye of the user and a third eye information of a second eye of the user by mirror symmetrizing the first eye information.

The disclosure provides a non-transitory computer readable storage medium with a computer program to execute aforesaid calibration method.

It is to be understood that both the foregoing general description and the following detailed description are by examples and are intended to provide further explanation of the invention as claimed.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

Figure 1:
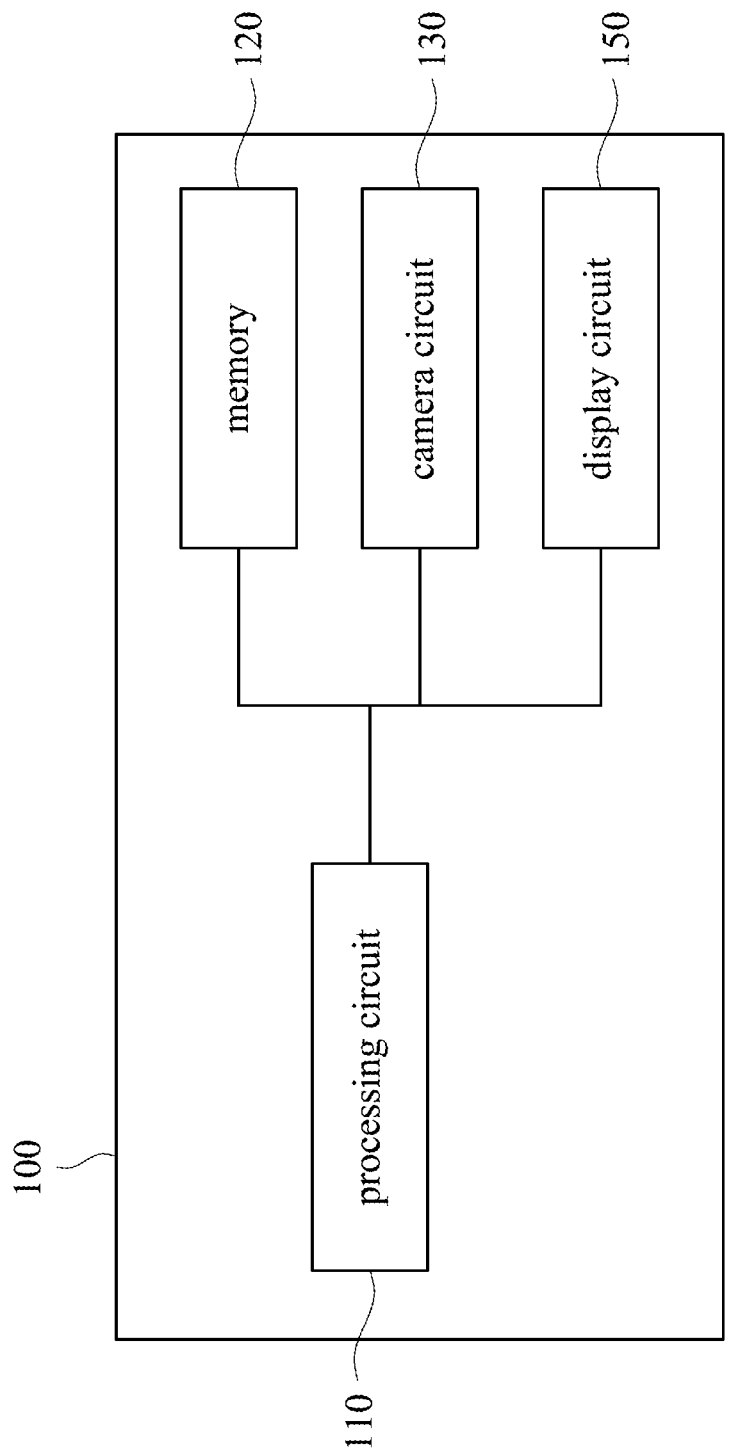
FIG. 1 is a schematic block diagram illustrating an electronic device in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference is made to FIG. 1. FIG. 1 is a schematic block diagram illustrating an electronic device 100 in accordance with some embodiments of the present disclosure. The electronic device 100 may be configured to perform eye tracking to detect a gazing direction of user. Specifically, in some embodiments, the electronic device 100 may be applied in a virtual reality (VR)/mixed reality (MR)/augmented reality (AR) system. For example, the electronic device 100 may be realized by, a standalone head mounted device (HMD) or VIVE HMD. In detail, the standalone HMD or VIVE HMD may handle such as processing location data of position and rotation, graph processing or others data calculation.

As shown in FIG. 1, the electronic device 100 includes a processing circuit 110, a memory 120, a camera circuit 130, and a display circuit 150. One or more programs are stored in the memory 120 and configured to be executed by the processing circuit 110, in order to perform the calibration method.

The processing circuit 110 is electrically connected to the camera circuit 130. In some embodiments, the processing circuit 110 can be realized by, for example, one or more processing circuits, such as central processing circuits and/or microprocessing circuits, but are not limited in this regard. In some embodiments, the memory 120 includes one or more memory devices, each of which includes, or a plurality of which collectively include a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

In structural, the memory 120 is electrically connected to the processing circuit 110. The camera circuit 130 is configured to capture one or more images of the eyes of the user, such that the processing circuit 110 may analyze the one or more images to perform eye tracking. In some embodiments, the camera circuit 130 may be realized by an infrared camera circuit device or any other camera circuit with image capture functions. It is noted that, the embodiments shown in FIG. 1 is merely an example and not meant to limit the present disclosure. The display circuit 150 is electrically connected to the processing circuit 110, such that the video and/or audio content displayed by the display circuit 150 is controlled by the processing circuit 110.

Figure 2:
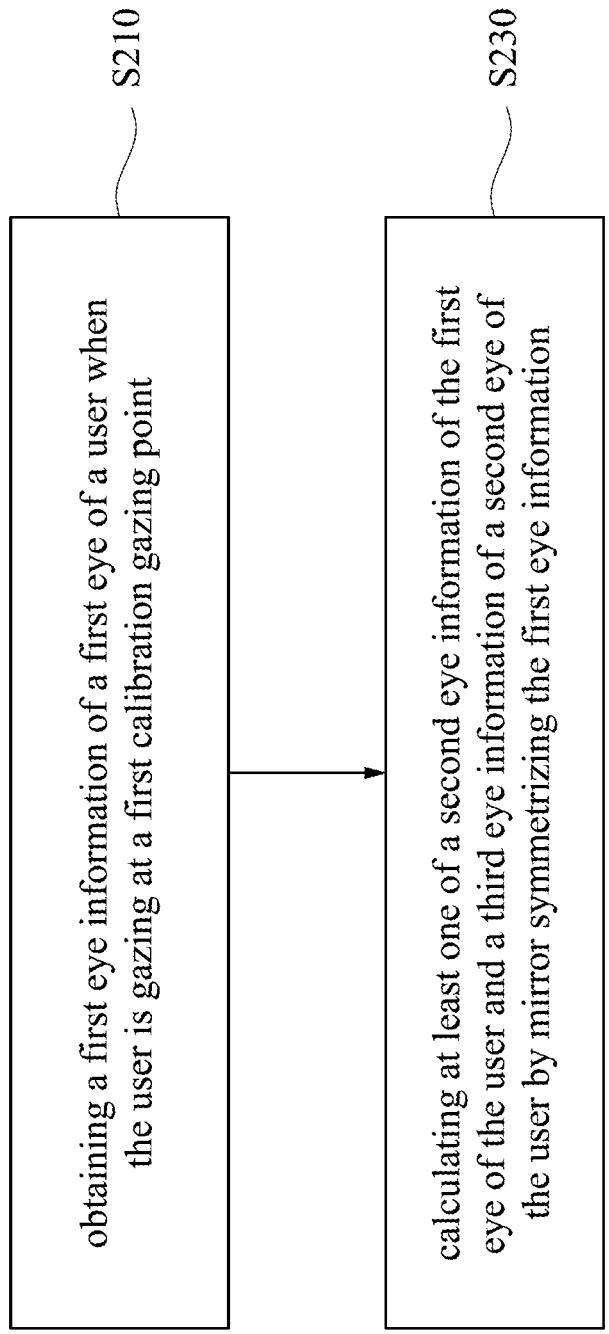
FIG. 2 is a flowchart illustrating the calibration method in accordance with some embodiments of the present disclosure.

Reference is made to FIG. 2. For better understanding of the present disclosure, the detailed operation of the electronic device 100 will be discussed in accompanying with the embodiments shown in FIG. 2. FIG. 2 is a flowchart illustrating the calibration method 200 in accordance with some embodiments of the present disclosure. It should be noted that the calibration method 200 can be applied to an electrical device having a structure that is the same as or similar to the structure of the electronic device 100 shown in FIG. 1. To simplify the description below, the embodiments shown in FIG. 1 will be used as an example to describe the calibration method 200 according to some embodiments of the present disclosure. However, the present disclosure is not limited to application to the embodiments shown in FIG. 1. As shown in FIG. 2, the calibration method 200 includes operations S210 to S230.

In operation S210, a first eye information of a first eye of a user is obtained by the camera circuit 130 when the user is gazing at a first calibration gazing point.

Figure 3:
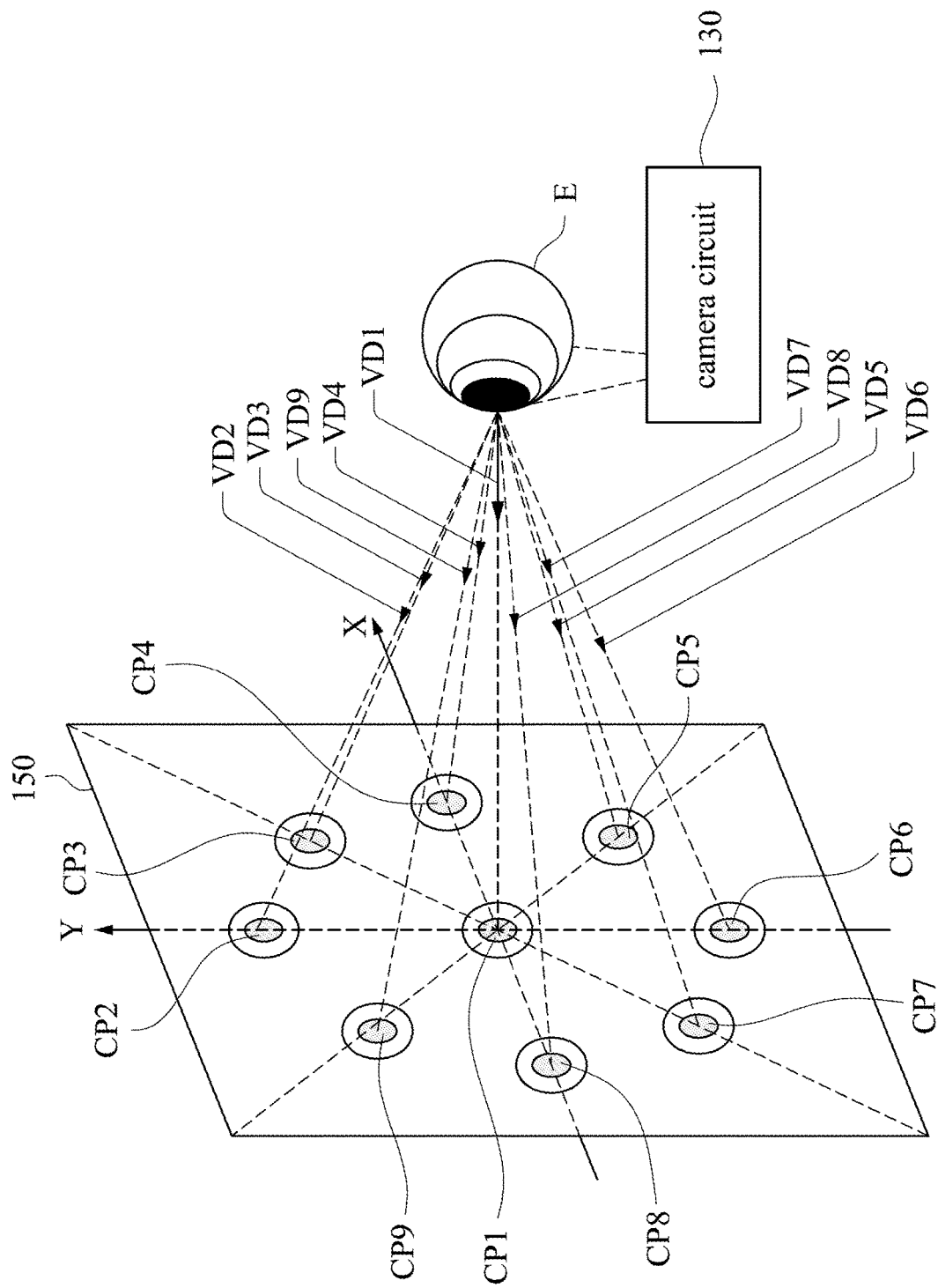
FIG. 3 is a diagram illustrating the operation of the electronic device according to some embodiments of the present disclosure.

Reference is made to FIG. 3 together. FIG. 3 is a diagram illustrating the operation of the electronic device 100 according to some embodiments of the present disclosure.

As shown in FIG. 3, in some embodiments, in operation S210, the processing circuit 110 may be configured to control the display circuit 150 to display calibration gazing points CP1-CP9 sequentially in multiple frames. The calibration gazing points CP1-CP9 correspond to multiple calibration gazing directions respectively.

For example, in the first frame as depicted in FIG. 3, the display circuit 150 is displaying the corresponding calibration gazing point CP1, which corresponds to the calibration gazing direction VD1. In the next frame, the display circuit 150 is displaying the corresponding calibration gazing point CP2, which corresponds to another calibration gazing direction VD3, and so on.

Accordingly, the processing circuit 110 may be configured to control the camera circuit 130 to capture the eye information of the eye in the multiple frames sequentially.

Assume that the calibration gazing point CP1 is located at the origin of the coordinate system. The calibration gazing point CP2 is located at coordinate (0,1), the calibration gazing point CP3 is located at coordinate ($\sqrt{0.5}$, $\sqrt{0.5}$), the calibration gazing point CP4 is located at coordinate (1,0), the calibration gazing point CP5 is located at coordinate ($\sqrt{0.5}$, $-\sqrt{0.5}$), the calibration gazing point CP6 is located at coordinate (0, −1), the calibration gazing point CP7 is located at coordinate ($-\sqrt{0.5}$, $-\sqrt{0.5}$), the calibration gazing point CP8 is located at coordinate (−1, 0), and the calibration gazing point CP9 is located at coordinate ($-\sqrt{0.5}$, $\sqrt{0.5}$). The coordinates of the calibration gazing points CP1 to CP9 are only for illustrative purposes only, and the embodiments of the present disclosure are not limited thereto.

For the eye E as illustrated in FIG. 3, when the eye E is gazing at the calibration gazing point CP4, the calibration gazing direction VD4 corresponding to the calibration gazing point CP4 is rightward to the eye E. When the eye E is gazing at the calibration gazing point CP8, the calibration gazing direction VD8 corresponding to the calibration gazing point CP8 is leftward to the eye E. When the eye E is gazing at the calibration gazing point CP2, the calibration gazing direction VD2 corresponding to the calibration gazing point CP2 is upward to the eye E. When the eye E is gazing at the calibration gazing point CP6, the calibration gazing direction VD6 corresponding to the calibration gazing point CP6 is downward to the eye E.

When the eye E is gazing at the calibration gazing point CP3, the calibration gazing direction VD3 corresponding to the calibration gazing point CP3 is upward-rightward to the eye E. When the eye E is gazing at the calibration gazing point CP5, the calibration gazing direction VD5 corresponding to the calibration gazing point CP5 is downward-rightward to the eye E. When the eye E is gazing at the calibration gazing point CP9, the calibration gazing direction VD9 corresponding to the calibration gazing point CP9 is upward-leftward to the eye E. When the eye E is gazing at the calibration gazing point CP7, the calibration gazing direction VD7 corresponding to the calibration gazing point CP7 is downward-leftward to the eye E.

Figure 4:
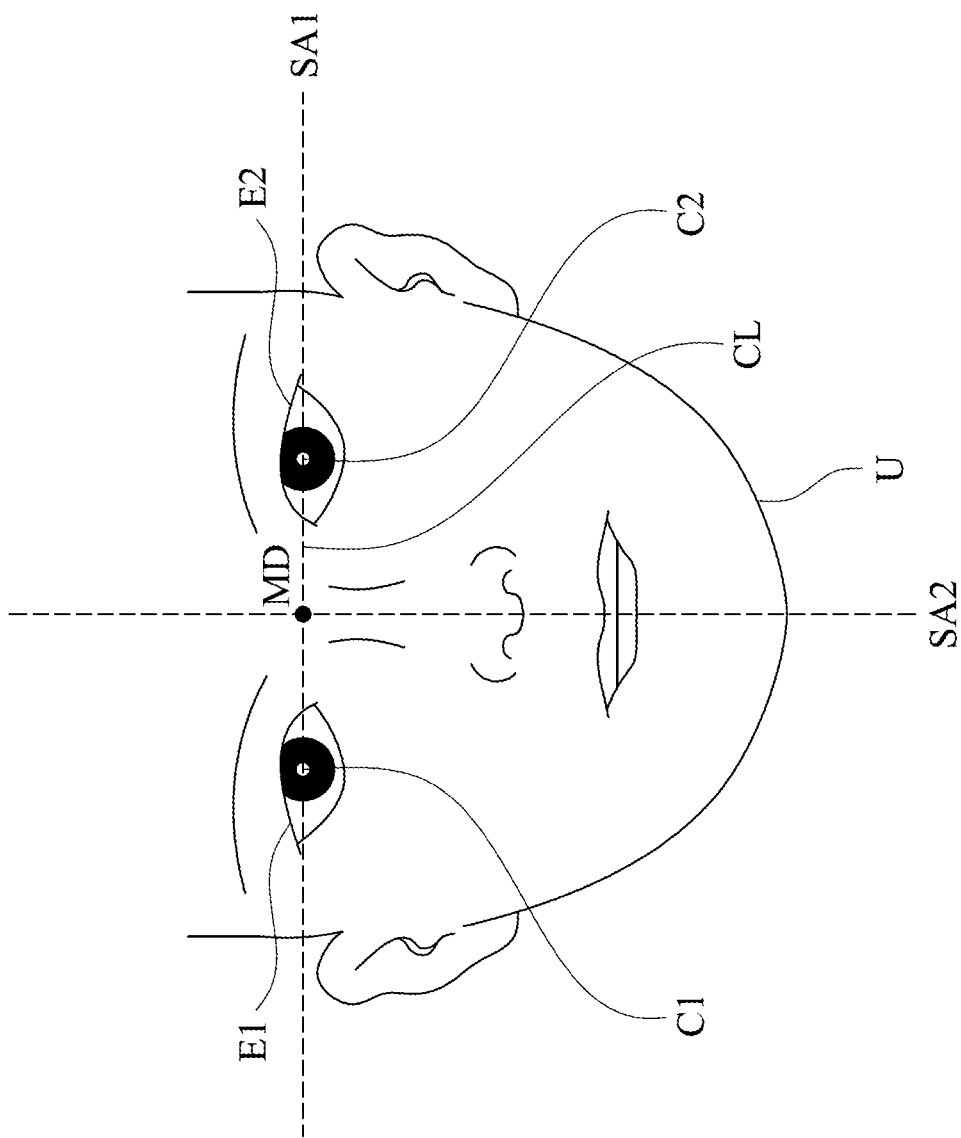
FIG. 4 is a schematic diagram illustrating a face of the user according to some embodiments of the present disclosure.

The eye E as illustrated in FIG. 3 may represent the left eye E2 or the right eye E1 as illustrated in FIG. 4.

If the eye E is the left eye E2 of the user U as illustrated in FIG. 4, leftward is the external side of the left eye E2 of the user U, and rightward is the internal side to the left eye E2 of the user U. On the other hand, if the eye E is the right eye E1 of the user U as illustrated in FIG. 4, leftward is the internal side to the right eye E1 of the user U, and rightward is the external side of the right eye E1 of the user U.

It should be noted that the calibration gazing points CP1 to CP9 are for illustrative purposes only and the embodiments of the present disclosure are not limited thereto.

During the calibration process, if all of the calibration gazing points CP1-CP9 are displayed and the corresponding eye information of both of the left eye and the right eye are obtained, the calibration process may cause a long time.

The embodiments of the present disclosure take advantage of the symmetry of the eyes, so as to reduce the calibration time.

Reference is made to FIG. 2 again. In operation S230, at least one of a second eye information of the first eye of the user and a third eye information of a second eye of the user is calculated by mirror symmetrizing the first eye information by the processing circuit 110 as illustrated in FIG. 1.

Reference is made to FIG. 4. FIG. 4 is a schematic diagram illustrating a face of the user U according to some embodiments of the present disclosure. As illustrated in FIG. 4, a symmetry axis SA1 is located along a connecting line CL of the face of the user U. The connecting line CL connects between the center point C1 of the eye E1 and the center point C2 of the eye E2.

Another symmetry axis SA2 is located between the eye E1 and the eye E2. The symmetry axis SA2 is perpendicular to the symmetry axis SA1. The symmetry axis SA1 and the symmetry axis SA2 intersects at the point MD.

Figure 5A:
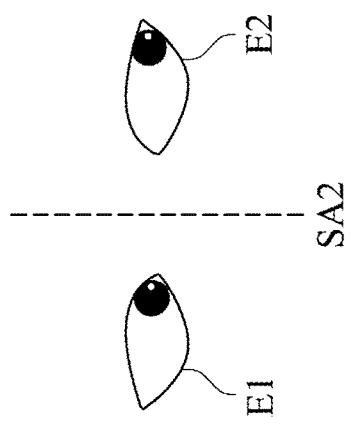
FIG. 5A is a schematic diagram illustrating an example of one of the operation in FIG. 2 according to some embodiments of the present disclosure.
Figure 5B:
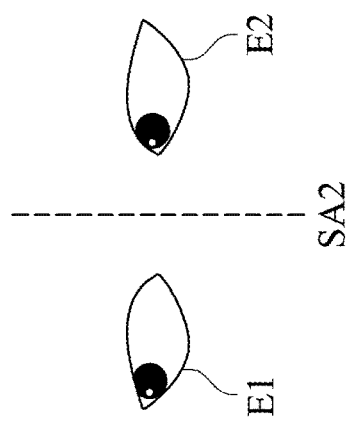
FIG. 5B is a schematic diagram illustrating an example of one of the operation in FIG. 2 according to some embodiments of the present disclosure.

Reference is made to FIG. 5A and FIG. 5B together. FIG. 5A and FIG. 5B are schematic diagrams illustrating an example of operation S230 according to some embodiments of the present disclosure.

Assume that in operation S210, as illustrated in FIG. 5A, the eye E1 and the eye E2 are gazing at the calibration gazing point CP8 as illustrated in FIG. 3. The processing circuit 110 as illustrated in FIG. 1 obtains an eye information corresponding to the calibration gazing point CP8 and the calibration gazing direction VD8 of the eye E2, in which the calibration gazing point CP8 and the calibration gazing direction VD8 corresponds to the eye E2 gazing at the external side of the face of the user U. At the same time, the processing circuit 110 as illustrated in FIG. 1 obtains an eye information corresponding to the calibration gazing point CP8 and the calibration gazing direction VD8 of the eye E1, in which the calibration gazing point CP8 and the calibration gazing direction VD8 corresponds to the eye E1 gazing at the internal side of the face of the user U.

Then, in operation S230, the processing circuit 110 as illustrated in FIG. 1 calculates the eye information corresponding to the calibration gazing point CP4 of the eye E1 according to the eye information corresponding to the calibration gazing point CP8 of the eye E2 by symmetrizing the eye information corresponding to the calibration gazing point CP8 of the eye E2 according to the symmetry axis SA2.

As shown in FIG. 3, the calibration gazing point CP8 and the calibration gazing point CP4 are mirror symmetrical to each other relative to the symmetry axis SA2. Since when the eye E1 is gazing at the calibration gazing point CP4, the eye E1 is gazing at the external side of the face of the user U, and when the eye E2 is gazing at the calibration gazing point CP8, the eye E1 is gazing at the external side of the face of the user U, the eye information of the eye E1 gazing at the calibration gazing point CP4 is similar to the eye information of the eye E2 gazing at the calibration gazing point CP8.

Therefore, the processing circuit 110 may calculate the eye information corresponding to the calibration gazing point CP4 of the eye E1 according to the eye information corresponding to the calibration gazing point CP8 of the eye E2 by symmetrizing the eye information corresponding to the calibration gazing point CP8 of the eye E2 according to the symmetry axis SA2 without displaying the calibration gazing point CP8.

Similarly, in operation S230, the processing circuit 110 as illustrated in FIG. 1 calculates the eye information corresponding to the calibration gazing point CP4 of the eye E2 according to the eye information corresponding to the calibration gazing point CP8 of the eye E1 by symmetrizing the eye information corresponding to the calibration gazing point CP8 of the eye E1 according to the symmetry axis SA2.

Since when the eye E1 is gazing at the calibration gazing point CP8, the eye E1 is gazing at the internal side of the face of the user U, and when the eye E2 is gazing at the calibration gazing point CP4, the eye E1 is gazing at the internal side of the face of the user U, the eye information of the eye E2 gazing at the calibration gazing point CP4 is similar to the eye information of the eye E1 gazing at the calibration gazing point CP8.

Therefore, the processing circuit 110 may calculate the eye information corresponding to the calibration gazing point CP4 of the eye E2 according to the eye information corresponding to the calibration gazing point CP8 of the eye E1 by symmetrizing the eye information corresponding to the calibration gazing point CP8 of the eye E1 according to the symmetry axis SA2 without displaying the calibration gazing point CP4.

In this way, the processing circuit 110 may obtain the eye information of the eye E2 gazing at the calibration gazing point CP4 as illustrated in FIG. 5B without displaying the calibration gazing point CP4, and the time of the calibration process is reduced.

It should be noted that, other eye information of one of the eyes corresponding to one of the calibration gazing points may be obtained according to the eye information of another one of the eyes corresponding to another one of the calibration gazing points, in which the another one of the calibration gazing points and the one of the calibration gazing points are mirror symmetrical relative to the symmetry axis SA2, since the calibration gazing direction of the one of the eyes gazing at the one of the calibration gazing points and the calibration gazing direction of the another one of the eyes gazing at the another one of the calibration gazing points are mirror symmetrical relative to the symmetry axis SA2.

For example, the eye information of the eye E2 gazing at the calibration gazing point CP3 is calculated according to the eye information of the eye E1 gazing at the calibration gazing point CP9. The eye information of the eye E2 gazing at the calibration gazing point CP6 is calculated according to the eye information of the eye E1 gazing at the calibration gazing point CP8, and so on.

Figure 6A:
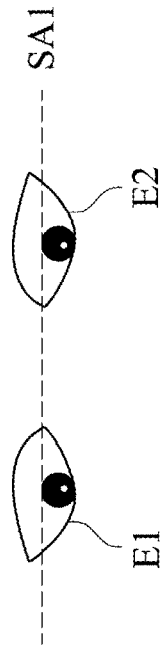
FIG. 6A is a schematic diagram illustrating another example of one of the operation in FIG. 2 according to some embodiments of the present disclosure.
Figure 6B:
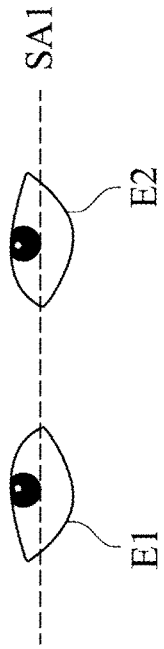
FIG. 6B is a schematic diagram illustrating another example of one of the operation in FIG. 2 according to some embodiments of the present disclosure.

Reference is made to FIG. 6A and FIG. 6B. FIG. 6A and FIG. 6B are schematic diagrams illustrating another example of operation S230 according to some embodiments of the present disclosure.

Assume that in operation S210, as illustrated in FIG. 6A, the eye E1 and the eye E2 are gazing at the calibration gazing point CP2 as illustrated in FIG. 3. The processing circuit 110 as illustrated in FIG. 1 obtains an eye information corresponding to the calibration gazing point CP2 and the calibration gazing direction VD2 of the eye E1, in which the calibration gazing point CP2 and the calibration gazing direction VD2 corresponds to the eye E1 gazing at the upward side of the face of the user U. At the same time, the processing circuit 110 as illustrated in FIG. 1 obtains an eye information corresponding to the calibration gazing point CP2 and the calibration gazing direction VD2 of the eye E2, in which the calibration gazing point CP2 and the calibration gazing direction VD2 corresponds to the eye E2 gazing at the upward side of the face of the user U.

Then, in operation S230, the processing circuit 110 as illustrated in FIG. 1 calculates the eye information corresponding to the calibration gazing point CP6 of the eye E1 according to the eye information corresponding to the calibration gazing point CP2 of the eye E1 by symmetrizing the eye information corresponding to the calibration gazing point CP2 of the eye E1 according to the symmetry axis SA1.

As shown in FIG. 3, the calibration gazing point CP2 and the calibration gazing point CP6 are mirror symmetrical to each other relative to the symmetry axis SA1. Since when the eye E1 is gazing at the calibration gazing point CP2, the eye E1 is gazing at the upward of the face of the user U, and when the eye E1 is gazing at the calibration gazing point CP6, the eye E1 is gazing at the downward side of the face of the user U, the eye information of the eye E1 gazing at the calibration gazing point CP6 and the eye information of the eye E1 gazing at the calibration gazing point CP2 are mirror symmetrical relative to the symmetry axis SA1.

Therefore, the processing circuit 110 may calculate the eye information corresponding to the calibration gazing point CP6 and the calibration gazing direction VD6 of the eye E1 according to the eye information corresponding to the calibration gazing point CP2 and the calibration gazing direction VD2 of the eye E1 by symmetrizing the eye information corresponding to the calibration gazing point CP2 and the calibration gazing direction VD2 of the eye E1 according to the symmetry axis SA1 without displaying the calibration gazing point CP2.

Similarly, in operation S230, the processing circuit 110 as illustrated in FIG. 1 calculates the eye information corresponding to the calibration gazing point CP6 of the eye E2 according to the eye information corresponding to the calibration gazing point CP2 of the eye E2 by symmetrizing the eye information corresponding to the calibration gazing point CP2 of the eye E2 according to the symmetry axis SA1.

Since when the eye E2 is gazing at the calibration gazing point CP2, the eye E2 is gazing at the upward of the face of the user U, and when the eye E1 is gazing at the calibration gazing point CP6, the eye E1 is gazing at the downward side of the face of the user U, the eye information of the eye E2 gazing at the calibration gazing point CP6 and the eye information of the eye E2 gazing at the calibration gazing point CP2 are mirror symmetrical to each other relative to the symmetry axis SA1.

Therefore, the processing circuit 110 may calculate the eye information corresponding to the calibration gazing point CP6 and the calibration gazing direction VD6 of the eye E2 according to the eye information corresponding to the calibration gazing point CP2 and the calibration gazing direction VD2 of the eye E2 by symmetrizing the eye information corresponding to the calibration gazing point CP2 and the calibration gazing direction VD2 of the eye E2 according to the symmetry axis SA1 without displaying the calibration gazing point CP2.

In this way, the processing circuit 110 may obtain the eye information of the eye E1 and the eye E2 gazing at the calibration gazing point CP6 as illustrated in FIG. 6B without displaying the calibration gazing point CP6, and the time of the calibration process is reduced.

It should be noted that, other eye information of one of the eyes corresponding to one of the calibration gazing points may be obtained according to the eye information of the one of the eyes corresponding to another one of the calibration gazing points, in which the another one of the calibration gazing points and the one of the calibration gazing points are mirror symmetrical to each other relative to the symmetry axis SA1, since the calibration gazing direction of the one of the eyes gazing at the one of the calibration gazing points and the calibration gazing direction of the one of the eyes gazing at the another one of the calibration gazing points are mirror symmetrical to each other relative to the symmetry axis SA1.

For example, the eye information of the eye E1 gazing at the calibration gazing point CP9 is calculated according to the eye information of the eye E1 gazing at the calibration gazing point CP8. The eye information of the eye E2 gazing at the calibration gazing point CP9 is calculated according to the eye information of the eye E2 gazing at the calibration gazing point CP8, and so on.

The eye information includes the shape and the corresponding coordinates of the whites of the eyes and the eyeballs of the eyes, the reflected light spot form the eyes relative to the light source, etc.

Figure 7:
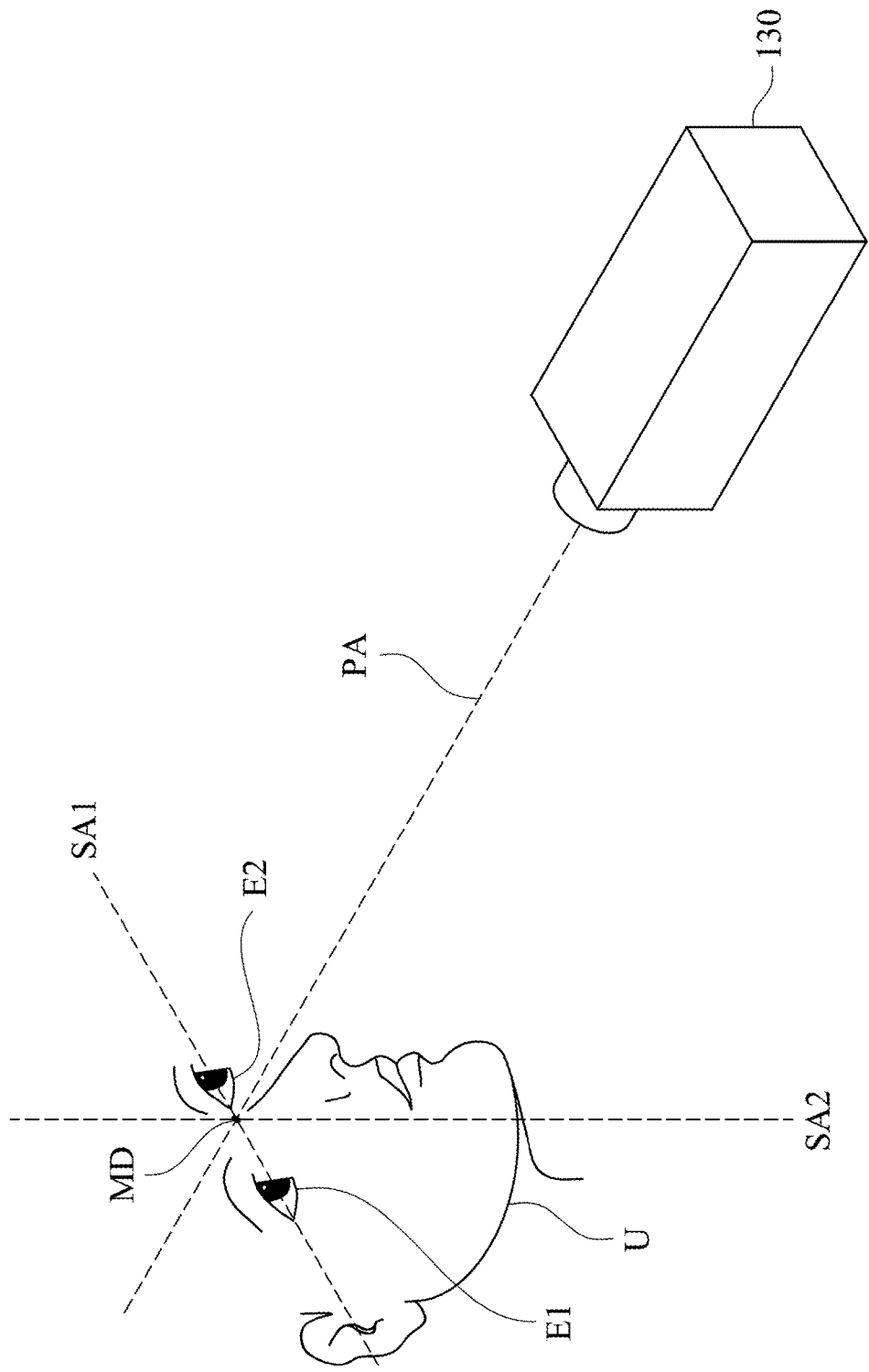
FIG. 7 is a schematic diagram illustrating a location of the camera circuit according to some embodiments of the present disclosure.

Reference is made to FIG. 7. FIG. 7 is a schematic diagram illustrating a location of the camera circuit 130 according to some embodiments of the present disclosure. As illustrated in FIG. 7, the camera circuit 130 is located at the extension of the perpendicular line PA. The perpendicular line PA is perpendicular to the symmetry axis SA1 and the symmetry axis SA2, and the symmetry axis SA1 and the symmetry axis SA2 intersects with the perpendicular line PA at the point MD.

When the camera circuit 130 is located on the extension of the perpendicular line PA, the eye E1 and the eye E2 are mirror symmetrical to each other relative to the camera circuit 130. The upward part of the eye E1 above the symmetry axis SA1 and the downward part of the eye E1 below the symmetry axis SA1 are mirror symmetrical to each other relative to the camera circuit 130.

For the eye information of the shape and the corresponding coordinates of the whites of the eyes and the eyeballs of the eyes, the camera circuit 130 has to be placed on the perpendicular line PA so that the eye information can be calculated according to the symmetry axis SA1.

For the eye information of the reflected light spot from the eyes relative to the light sources, etc. The camera circuit 130 has to be placed on the perpendicular line PA and the distribution of the hardware of the light sources has to be symmetrical relative to the camera circuit 130, so that the eye information can be calculated according to the symmetry axis SA1 and the symmetry axis SA2.

Reference is made to FIG. 3 again. In some embodiments, the eye information can be calculated according to the symmetry axis SA1 and the symmetry axis SA2 together. For example, in one embodiment, after the camera circuit 130 obtains the eye information corresponding to the calibration gazing point CP9, the processing circuit 110 obtains the eye information corresponding to the calibration gazing point CP7 according to the calibration gazing point CP9 and according to the symmetry axis SA1. Then, the processing circuit 110 obtains the eye information corresponding to the calibration gazing point CP3 according to the calibration gazing point CP9 and according to the symmetry axis SA2, and the processing circuit 110 obtains the eye information corresponding to the calibration gazing point CP5 according to the calibration gazing point CP7 and according to the symmetry axis SA2.

In another embodiment, after the camera circuit 130 obtains the eye information corresponding to the calibration gazing point CP9, the processing circuit 110 obtains the eye information corresponding to the calibration gazing point CP3 according to the calibration gazing point CP9 and according to the symmetry axis SA2. Then, the processing circuit 110 obtains the eye information corresponding to the calibration gazing point CP7 according to the calibration gazing point CP9 and according to the symmetry axis SA1, and the processing circuit 110 obtains the eye information corresponding to the calibration gazing point CP5 according to the calibration gazing point CP3 and according to the symmetry axis SA1.

By calculating the eye information according to the symmetry axis SA1 and the symmetry axis SA2 at the same time, the time for the calibration process can be reduced.

In some embodiments, the camera circuit 130 can be a close up camera which is able to capture images within a close range. In some embodiments, the electronic device 100 further includes at least one mirror configured to reflect the images of the eyes to a farther place so that the camera circuit 130 is able to capture the images of the eyes.

Through the operations of various embodiments described above, a calibration method, an electronic device, and a non-transitory computer readable storage medium are implemented, by calculating the eye information according to the symmetry of the eyes and the corresponding symmetry axis, the time of the calibration process can be reduced and the accuracy of the calibration process can be increased.

It is noted that the above embodiments are simplified for better understanding of the present disclosure. It should be noted that, in some embodiments, the calibration method 200 may be implemented as a computer program. When the computer program is executed by a computer, an electronic device, or the processing circuit 110 in FIG. 1, this executing device performs the calibration method 200. The computer program can be stored in a non-transitory computer readable storage medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

In addition, it should be noted that in the operations of the abovementioned calibration method 200, no particular sequence is required unless otherwise specified. Moreover, the operations may also be performed simultaneously or the execution times thereof may at least partially overlap.

Furthermore, the operations of the calibration method 200 may be added to, replaced, and/or eliminated as appropriate, in accordance with various embodiments of the present disclosure.

Various functional components or blocks have been described herein. As will be appreciated by persons skilled in the art, the functional blocks will preferably be implemented through circuits (either dedicated circuits, or general purpose circuits, which operate under the control of one or more processing circuits and coded instructions), which will typically include transistors or other circuit elements that are configured in such a way as to control the operation of the circuitry in accordance with the functions and operations described herein.

Although the present disclosure has been described in considerable detail with reference to certain embodiments thereof, other embodiments are possible. Therefore, the scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A calibration method, suitable for an electronic device comprising an HMD device (head-mounted device), wherein the calibration method comprises:
    obtaining a first eye information of a first eye of a user when the user is gazing at a first calibration gazing point; and
    calculating at least one of a second eye information of the first eye of the user and a third eye information of a second eye of the user by mirror symmetrizing the first eye information,
    wherein a first symmetry axis is located at a connecting line of a first center point of the first eye and a second center point of the second eye, wherein a second symmetry axis is located between the first eye and the second eye and the second symmetry axis is perpendicular to the first symmetry axis, and the third eye information of the second eye and the first eye information are mirror symmetrical relative to the second symmetry axis.

2. The calibration method of claim 1, wherein the second eye information of the first eye and the first eye information are mirror symmetrical relative to the first symmetry axis.

3. The calibration method of claim 2, wherein when the first eye information is obtained with the first eye gazing at the first calibration gazing point and a first calibration gazing direction corresponding to the first calibration gazing point is upward, the second eye information is corresponding to the first eye gazing at a second calibration gazing point and a second calibration gazing direction corresponding to the second calibration gazing point is downward, wherein the first calibration gazing point and the second calibration gazing point are mirror symmetrical relative to the first symmetry axis;

wherein when the first eye information is obtained with the first eye gazing at the first calibration gazing point and the first calibration gazing direction is downward, the second eye information is corresponding to the first eye gazing at the second calibration gazing point and the second calibration gazing direction is upward, wherein the first calibration gazing point and the second calibration gazing point are mirror symmetrical relative to the first symmetry axis.

4. The calibration method of claim 2, wherein the first eye information is captured by a camera circuit located at a perpendicular line, wherein the perpendicular line is perpendicular to the first symmetry axis and the second symmetry axis.

5. The calibration method of claim 1, wherein when the first eye information is obtained with the first eye gazing at the first calibration gazing point and a first calibration gazing direction corresponding to the first calibration gazing point is toward a first external side of the first eye, the third eye information is corresponding to the second eye gazing at a second calibration gazing point and a second calibration gazing direction corresponding to the second calibration gazing point is toward a second external side of the second eye, wherein the first calibration gazing point and the second calibration gazing point are mirror symmetrical relative to the second symmetry axis;

wherein when the first eye information is obtained with the first eye gazing at the first calibration gazing point and the first calibration gazing direction is toward a first internal side of the first eye, the third eye information is corresponding to the second eye gazing at the second calibration gazing point and the second calibration gazing direction is toward a second internal side of the second eye, wherein the first calibration gazing point and the second calibration gazing point are mirror symmetrical relative to the second symmetry axis.

6. The calibration method of claim 1, further comprising:
calculating a fourth eye information of the second eye by mirror symmetrizing the at least one of the second eye information and the third eye information.

7. An electronic device, comprising:
a camera circuit, configured to capture a first eye information of a first eye of a user when the user is gazing at a first calibration gazing point; and
a processing circuit, coupled to the camera circuit, wherein the processing circuit is configured to calculate at least one of a second eye information of the first eye of the user and a third eye information of a second eye of the user by mirror symmetrizing the first eye information,
wherein a first symmetry axis is located at a connecting line of a first center point of the first eye and a second center point of the second eye, wherein a second symmetry axis is located between the first eye and the second eye and the second symmetry axis is perpendicular to the first symmetry axis, and the third eye information of the second eye and the first eye information are mirror symmetrical relative to the second symmetry axis.

8. The electronic device of claim 7, wherein the second eye information of the first eye and the first eye information are mirror symmetrical relative to the first symmetry axis.

9. The electronic device of claim 8, wherein when the first eye information is obtained with the first eye gazing at the first calibration gazing point and a first calibration gazing direction corresponding to the first calibration gazing point is upward, the second eye information is corresponding to the first eye gazing at a second calibration gazing point and a second calibration gazing direction corresponding to the second calibration gazing point is downward, wherein the first calibration gazing point and the second calibration gazing point are mirror symmetrical relative to the first symmetry axis;

wherein when the first eye information is obtained with the first eye gazing at the first calibration gazing point and the first calibration gazing direction is downward, the second eye information is corresponding to the first eye gazing at the second calibration gazing point and the second calibration gazing direction is upward, wherein the first calibration gazing point and the second calibration gazing point are mirror symmetrical relative to the first symmetry axis.

10. The electronic device of claim 8, wherein the camera circuit is located at a perpendicular line, wherein the perpendicular line is perpendicular to the first symmetry axis and the second symmetry axis.

11. The electronic device of claim 7, wherein when the first eye information is obtained with the first eye gazing at the first calibration gazing point and a first calibration gazing direction corresponding to the first calibration gazing point is toward a first external side of the first eye, the third eye information is corresponding to the second eye gazing at a second calibration gazing point and a second calibration gazing direction corresponding to the second calibration gazing point is toward a second external side of the second eye, wherein the first calibration gazing point and the second calibration gazing point are mirror symmetrical relative to the second symmetry axis;

wherein when the first eye information is obtained with the first eye gazing at the first calibration gazing point and the first calibration gazing direction is toward a first internal side of the first eye, the third eye information is corresponding to the second eye gazing at the second calibration gazing point and the second calibration gazing direction is toward a second internal side of the second eye, wherein the first calibration gazing point and the second calibration gazing point are mirror symmetrical relative to the second symmetry axis.

12. The electronic device of claim 7, wherein the processing circuit is further configured to calculate a fourth eye information of the second eye by mirror symmetrizing the at least one of the second eye information and the third eye information.

13. A non-transitory computer readable storage medium storing a computer program, wherein the computer program performs a calibration method when loaded into and executed by a processing circuit of an electronic device, wherein the calibration method comprises:
obtaining a first eye information of a first eye of a user when the user is gazing at a first calibration gazing point by a camera circuit; and
calculating at least one of a second eye information of the first eye of the user and a third eye information of a second eye of the user by mirror symmetrizing the first eye information by the processing circuit,
wherein a first symmetry axis is located along a connecting line of a first center point of the first eye and a second center point of the second eye, wherein a second symmetry axis is located between the first eye and the second eye and the second symmetry axis is perpendicular to the first symmetry axis, and the third eye information of the second eye and the first eye information are mirror symmetrical relative to the second symmetry axis.

14. The non-transitory computer readable storage medium of claim 13, wherein the second eye information of the first eye and the first eye information are mirror symmetrical relative to the first symmetry axis.

15. The non-transitory computer readable storage medium of claim 14, wherein when the first eye information is obtained with the first eye gazing at the first calibration gazing point and a first calibration gazing direction corresponding to the first calibration gazing point is upward, the second eye information is corresponding to the first eye gazing at a second calibration gazing point and a second calibration gazing direction corresponding to the second calibration gazing point is downward, wherein the first calibration gazing point and the second calibration gazing point are mirror symmetrical relative to the first symmetry axis;

wherein when the first eye information is obtained with the first eye gazing at the first calibration gazing point and the first calibration gazing direction is downward, the second eye information is corresponding to the first eye gazing at the second calibration gazing point and the second calibration gazing direction is upward, wherein the first calibration gazing point and the second calibration gazing point are mirror symmetrical relative to the first symmetry axis.

16. The non-transitory computer readable storage medium of claim 13, wherein when the first eye information is obtained with the first eye gazing at the first calibration gazing point and a first calibration gazing direction corresponding to the first calibration gazing point is toward a first external side of the first eye, the third eye information is corresponding to the second eye gazing at a second calibration gazing point and a second calibration gazing direction corresponding to the second calibration gazing point is toward a second external side of the second eye, wherein the first calibration gazing point and the second calibration gazing point are mirror symmetrical relative to the second symmetry axis;

wherein when the first eye information is obtained with the first eye gazing at the first calibration gazing point and the first calibration gazing direction is toward a first internal side of the first eye, the third eye information is corresponding to the second eye gazing at the second calibration gazing point and the second calibration gazing direction is toward a second internal side of the second eye, wherein the first calibration gazing point and the second calibration gazing point are mirror symmetrical relative to the second symmetry axis.

17. The non-transitory computer readable storage medium of claim 13, wherein the calibration method further comprises:

calculating a fourth eye information of the second eye by mirror symmetrizing the at least one of the second eye information and the third eye information.

* * * * *